Nov. 4, 1924.

J. P. RICHTER 1,514,341

AUXILIARY SPRING SNUBBER

Filed Aug. 6, 1923

Inventor
J. P. RICHTER.

Attorney

Patented Nov. 4, 1924.

1,514,341

UNITED STATES PATENT OFFICE.

JOHN P. RICHTER, OF BIRMINGHAM, ALABAMA, ASSIGNOR OF THREE-FOURTHS TO SALLIE M. BRADLEY AND ONE-FOURTH TO T. M. BRADLEY, JR., BOTH OF BIRMINGHAM, ALABAMA.

AUXILIARY SPRING SNUBBER.

Application filed August 6, 1923. Serial No. 656,032.

*To all whom it may concern:*

Be it known that I, JOHN P. RICHTER, a citizen of the United States of America, residing at Birmingham, in the county of Jefferson and State of Alabama, have invented certain new and useful Improvements in Auxiliary Spring Snubbers, of which the following is a specification.

This invention relates to an auxiliary spring snubber for vehicles which is particularly designed for affording easy riding while serving as a means to protect automobile springs and prevent their breakage.

More particularly my object is to design a simple and inexpensive spring protecting snubber which can be readily attached to and removed from any make of automobile; which will require no changes in the body structure; and which will eliminate roughness in riding after the fashion of the shock absorber so as to minimize jolts and jars and make the riding smooth and easy.

A further object is to design the snubbing spring protector so as to guard effectively against noise or rattle of parts, and my invention is especially designed to this end, its attachments being so adjusted and made rigid where needed to the end that noise and rattling is eliminated.

My invention further contemplates the utilization of adjustable straps as a means for connecting the auxiliary snubbing spring and overhead elements rigid with the chassis, these straps being readily adjustable or removable so that their auxiliary snubbing spring can be easily removed, repaired and replaced.

My invention further comprises the novel details of construction and arrangements of parts, which in their preferred embodiment only are illustrated in the accompanying drawings which form a part of this specification, and in which:—

Similar reference numerals refer to similar parts throughout the drawings.

Figure 1:
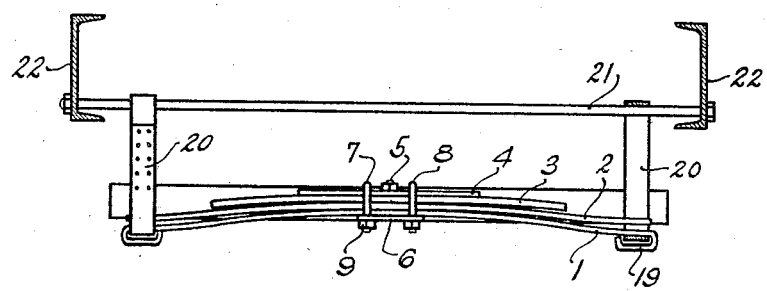
Figs. 1 and 2 are respectively elevation and plan views of the rear auxiliary spring snubber as applied to a chassis shown broken away.
Figure 2:
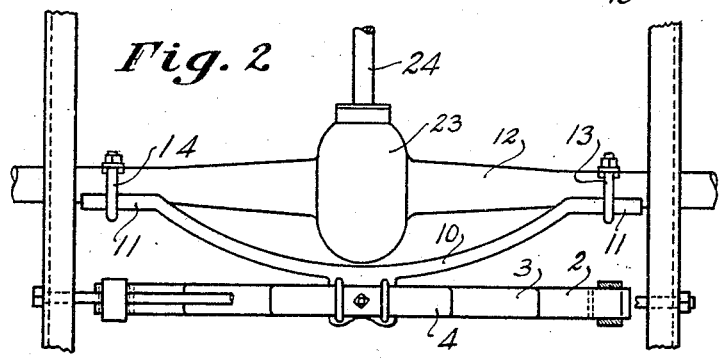

In the embodiment of my invention illustrated in Figs. 1 and 2, I show the auxiliary spring snubber as comprising a main leaf member 1 made of spring steel and designed to catch the slightest rebound. Above this is a leaf member 2 also of spring steel which has its free ends standing slightly spaced above the free ends of the spring member 1 and which thus is adapted, when engaged by the latter member, to catch and absorb rebounds slightly exceeding the capacity of the spring 1. The members 1 and 2 are of substantially the same length. Mounted above the leaf 2 is the leaf member 3 which is also of spring steel and is shorter than the member 2 and its free ends are but slightly spaced from the member 2 so that this will take care of and absorb rebounds in excess of the capacity of the springs 1 and 2. The top leaf member 4 is shorter than the member 3 and is practically straight and is designed to take care of the rebounds in excess of the combined capacity of the members 1, 2 and 3. These four spring leaves are held together by a center bolt 5 and two U-bolt clips 7 and 8 which are connected to the bracket 6 by means of nuts 9. The bracket 6 is preferably integral with a yoke 10 arched or curved as viewed in plan and provided at its ends with axle engaging portions 11 curved to conform to the curvature of the rear axle housing 12 to which they are connected by clip members 13 and 14, which clips are of the U-bolt type each having a tip or boss 15 adapted to engage in a hole 16 in its respective yoke bracket end 11, thus positively connecting the bracket to the U-bolts. The clips 13 and 14 are connected by bolts 17 to two V-grip clamp members 18, preferably made of tool steel, which are drawn tightly against the axle housing 12 so that they will effectively prevent any slipping of the clips about the same. Each end of the leaf spring 1 is bent on itself to form a loop or eye 19 for the reception of a strap 20 which is adapted to be passed over the brace rod 21 connecting the frame members 22 at the rear of the chassis. The straps 20 can be adjusted as to length in any desired manner. By the arrangement shown the snubber can be installed directly behind the differential housing 23 or its yoke support can be swung forwardly so as to mount the snubber above or below the drive shaft 24, and it can be set at any desired angle to a horizontal plane which is best suited for the convenient application or operation of the straps 20.

Figure 3:
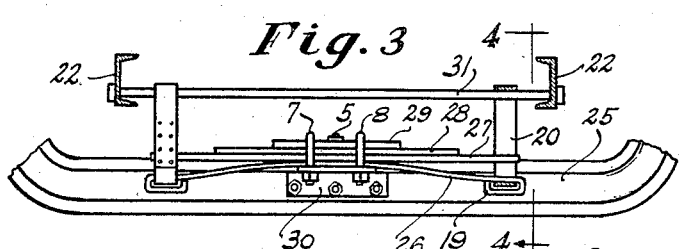
Fig. 3 is an elevation of a front auxiliary spring snubber.
Figure 4:
Fig. 4 is a cross-sectional view taken on the line 4—4 of Fig. 3.
Figure 5:
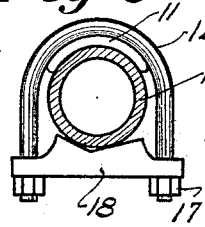
Figs. 5 and 6 are detail views in end elevation and cross section respectively of the clamp for attaching the auxiliary spring snubber mounting to the rear axle housing.
Figure 6:

In Fig. 3 I show the preferred adaptation of my invention as a front snubber mounted on the front axle 25. Here the auxiliary spring snubber is made up of a lower leaf member 26 having its ends bent down and formed into the loops 19 for holding straps 20 and working above this spring are three leaf members 27, 28 and 29 which are all shown of the straight type and successively shortened and they are connected to a bracket 30 by a center bolt 5 and clips 7 and 8 in the manner already described. This bracket 30 is preferably made of soft steel and is bolted or riveted to the front axle 25 so as to project either in front or to the rear thereof. The straps 20 here connect the main leaf member 26 to the front brace rod 31 connecting the sides 22 of the chassis.

Obviously my methods of attachment make it possible to apply my improved auxiliary snubber springs either to the front or rear of the front and rear axles and at the desired angle or elevation where they will be least unsightly, most convenient for service and most easily attached and removed. By the use of these auxiliary snubber springs the main springs of the automobile, which are generally made too light for the load intended to be carried in order that there may be more ease in riding and therefore are subject to breakage from rebound, can be stiffened and yet injurious rebound prevented and overcome. Each leaf of the auxiliary spring is designed with such difference in arch or length that it will perform the definite duty required of it when brought into service and the assembled spring snubber will become essentially an adjunct to the main springs designed to relieve them of severe strain and prolong their life.

In operation, due to the flexible connections 20, the auxiliary snubbing springs do not affect the action of the main springs as they respond to changes in the load on the vehicle or as bumps or inequalities cause the body to approach the running gear or the running gear to approach the body, but when the two move apart more than the length of the straps 20 the lower auxiliary spring members first resist the rebound movement with a relatively light resistance which is increased as each of the spring members above it is brought successively into play so that the snubber thus gradually and effectively kills the rebound and saves the main springs.

While I have shown the auxiliary spring as having four leaf members it is obvious that this number may be modified according to conditions and that the exact curvature, length or stiffness of the auxiliary spring leaves can be modified according to the duty required of them, all within the general scope and principle of my invention which it is to be understood may be otherwise modified and changed within the scope of the appended claims without departing from the essential features thereof.

Having thus described my invention, what I claim as new and desire to secure by Letters Patent, is:—

1. An auxiliary spring snubber, comprising in combination an assembly of leaf springs which decrease in length upwardly, a plurality of said leaves being spaced at their ends for the purposes described, flexible connections to the free ends of the lowermost spring leaf, a rigid body element engaged loosely overhead by each flexible connection, center clip means connecting said spring leaves, and a bracket for mounting said snubbing spring upon and parallel with a vehicle axle.

2. The combination with a vehicle body having a cross brace rod, of straps hung on said rod, an auxiliary snubber spring disposed transversely under the vehicle body, means to mount said spring at its center in overhung position on the adjacent vehicle axle beneath said rod, said spring comprising a series of leaves of different length and disposed to come successively into play, and means to connect the straps to the free ends of the lowermost leaf of said auxiliary spring.

3. An auxiliary spring snubber means in accordance with claim 2, in which the means to connect the spring to the adjacent axle is adapted to mount the spring in front or to the rear of its supporting axle.

4. An auxiliary spring snubber means in accordance with claim 2, in which the means connecting the spring snubber to the axle is adjustable angularly about the axle.

5. In an auxiliary spring snubber for vehicles, a body having rigid strap supporting means thereon, straps hung from said supporting means, a snubbing spring comprising a plurality of superposed leaves, the lowermost having eyes at its ends to receive said straps and the leaves above being shorter and spaced to successively come into play as the lower spring leaf is drawn upwardly by the pull of said straps, and a bracket having means at its center to connect said snubber spring thereto and having means to clamp its ends to the adjacent vehicle axle in overhung position free for angular adjustment about the same.

6. An auxiliary non-load-supporting spring to check vehicle body rebounds, comprising a leaf spring having leaves which decrease upwardly in length and at least two of the lowermost of which leaves are spaced, flexible connections to the lowermost spring leaf, means rigid with the body which said connections engage overhead, a center fastening for the spring leaves, and a bracket for so mounting said auxiliary spring rigidly on a supporting axle for said body that its spaced leaves come successively into action to check excessive body rebounds.

In testimony whereof I affix my signature.

JOHN P. RICHTER.

Witness:
NOMIE WELSH.